US011216028B1

(12) United States Patent
Cheng et al.

(10) Patent No.: US 11,216,028 B1
(45) Date of Patent: Jan. 4, 2022

(54) MOBILE DEVICE KEYBOARD FIXING STRUCTURE

(71) Applicant: Getac Technology Corporation, Hsinchu County (TW)

(72) Inventors: Kuo-Heng Cheng, Taipei (TW); Juei-Chi Chang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 16/995,040

(22) Filed: Aug. 17, 2020

(51) Int. Cl.
*G06F 1/16* (2006.01)
(52) U.S. Cl.
CPC ................... *G06F 1/1616* (2013.01)
(58) Field of Classification Search
CPC ...................................................... G06F 1/1669
See application file for complete search history.

(56) References Cited

U.S. PATENT DOCUMENTS

| | | | | |
|---|---|---|---|---|
| 5,739,810 A * | 4/1998 | Merkel | ............... | G06F 1/1616 345/156 |
| 5,808,861 A * | 9/1998 | Nakajima | ............... | G06F 1/184 361/679.27 |
| 6,510,048 B2 * | 1/2003 | Rubenson | ............... | G06F 1/1616 361/679.09 |
| 6,672,796 B2 * | 1/2004 | Chiang | ............... | G06F 1/1616 361/679.17 |
| 6,922,333 B2 * | 7/2005 | Weng | ............... | G06F 1/1616 220/230 |
| 7,551,428 B2 * | 6/2009 | Homer | ............... | G06F 1/1616 250/221 |
| 7,755,883 B2 * | 7/2010 | Hsu | ............... | G06F 1/1616 361/679.17 |
| 8,310,823 B2 * | 11/2012 | Stoltz | ............... | G06F 1/1696 361/679.17 |
| 8,422,212 B2 * | 4/2013 | Liu | ............... | G06F 1/1669 361/679.17 |
| 10,989,978 B1 * | 4/2021 | Tsen | ............... | G01R 33/072 |
| 2005/0041378 A1 * | 2/2005 | Hamada | ............... | G06F 1/1616 361/679.01 |
| 2013/0021735 A1 * | 1/2013 | Pu | ............... | G06F 1/1618 361/679.17 |
| 2014/0063710 A1 * | 3/2014 | Myung | ............... | G06F 1/1669 361/679.4 |
| 2017/0329370 A1 * | 11/2017 | Han | ............... | G06F 1/1656 |
| 2019/0196551 A1 * | 6/2019 | Wang | ............... | F21V 33/0052 |
| 2019/0198264 A1 * | 6/2019 | Chen | ............... | G06F 1/1669 |

* cited by examiner

*Primary Examiner* — Anthony Q Edwards
(74) *Attorney, Agent, or Firm* — Locke Lord LLP; Tim Tingkang Xia, Esq.

(57) ABSTRACT

Provided is a mobile device keyboard fixing structure including a body, a screen pivot component, a keyboard and a keyboard lid. The screen pivot component is disposed at the body. The keyboard is disposed at the body. The keyboard lid includes a panel and a pivot cover. The pivot cover has a fixing portion. A bend groove is formed between the panel and the fixing portion. The screen pivot component is received inside the pivot cover. The fixing portion fixes the screen pivot component in place. The panel presses against an edge of the keyboard and is demountably fastened to the body, such that the panel can be inverted along the bend groove relative to the fixing portion. Therefore, the keyboard can be changed quickly and protected against damage.

12 Claims, 11 Drawing Sheets

MOBILE DEVICE KEYBOARD FIXING STRUCTURE

BACKGROUND OF THE INVENTION

Field of the Invention

The present disclosure relates to keyboard fixing structures and, more particularly, to a mobile device keyboard fixing structure which can be opened rather than demounted, in order for a keyboard to be mounted and demounted.

Description of the Prior Art

The edge of the keyboard of a conventional laptop is typically pressed against and fixed to the body of the laptop, using a lid. The lid is fastened to the body of the laptop; thus, the lid has to be demounted in order for the keyboard to be changed. As a result, it is inconvenient to change or repair the keyboard. Furthermore, the lid is typically connected to a protective cover of a screen pivot and fastened to the screen pivot. A screen flexible flat cable typically lies at the screen pivot. As a result, after the lid has been demounted, the flexible flat cable becomes exposed and thus susceptible to damage.

Therefore, it is imperative to provide a mobile device keyboard fixing structure which can be opened rather than demounted, in order for the keyboard to be mounted and demounted.

SUMMARY OF THE INVENTION

The present disclosure provides a mobile device keyboard fixing structure which can be opened rather than demounted, in order for the keyboard to be mounted and demounted.

The present disclosure provides a mobile device keyboard fixing structure comprising a body, a screen pivot component, a keyboard and a keyboard lid. The screen pivot component is disposed at the body. The keyboard is disposed at the body. The keyboard lid comprises a panel and a pivot cover. The pivot cover has a fixing portion. A bend groove is formed between the panel and the fixing portion. The screen pivot component is received inside the pivot cover. The fixing portion fixes the screen pivot component in place. The panel presses against an edge of the keyboard and is demountably fastened to the body, such that the panel can be inverted along the bend groove relative to the fixing portion.

The mobile device keyboard fixing structure of the present disclosure is described below. The screen pivot component is connected to a screen component. The screen component has a transmission wire extended outward. The transmission wire penetrates the pivot cover and then extends to the inside of the body. At least one function key hole is penetratingly formed on the panel. The bend groove is formed on one of the sides of the keyboard lid, and another bend groove is formed at a corresponding point on the other side of the keyboard lid. The keyboard lid is made of thermoplastic polyurethane (TPU) and integrally formed. The fixing portion is fastened to the screen pivot component. The bend groove extends across the surface of the keyboard lid. The bend groove starts from one edge of the keyboard lid, crosses the keyboard lid, and reaches the other edge of the keyboard lid.

The mobile device keyboard fixing structure of the present disclosure is further described below. The bend groove is formed on the pivot cover. The pivot cover has an inversion lid. The inversion lid connects to the panel and the fixing portion. The bend groove is formed at a junction between the inversion lid and the fixing portion. The inversion lid can be inverted along the bend groove relative to the fixing portion. The inversion lid and the fixing portion cover two opposite sides of the screen pivot component, respectively.

The mobile device keyboard fixing structure of the present disclosure is further described below. The keyboard lid has a connecting portion. The connecting portion connects to the panel and the pivot cover. The bend groove is formed at a junction between the panel and the connecting portion. The connecting portion covers the body. The connecting portion is fastened to the body.

The mobile device keyboard fixing structure of the present disclosure is further described below. The keyboard lid has thereon a bend groove. Therefore, the panel of the keyboard lid can be inverted and opened along the bend groove to release the keyboard. Therefore, the keyboard can be changed quickly and protected against damage.

DETAILED DESCRIPTION OF THE EMBODIMENTS

Figure 1:
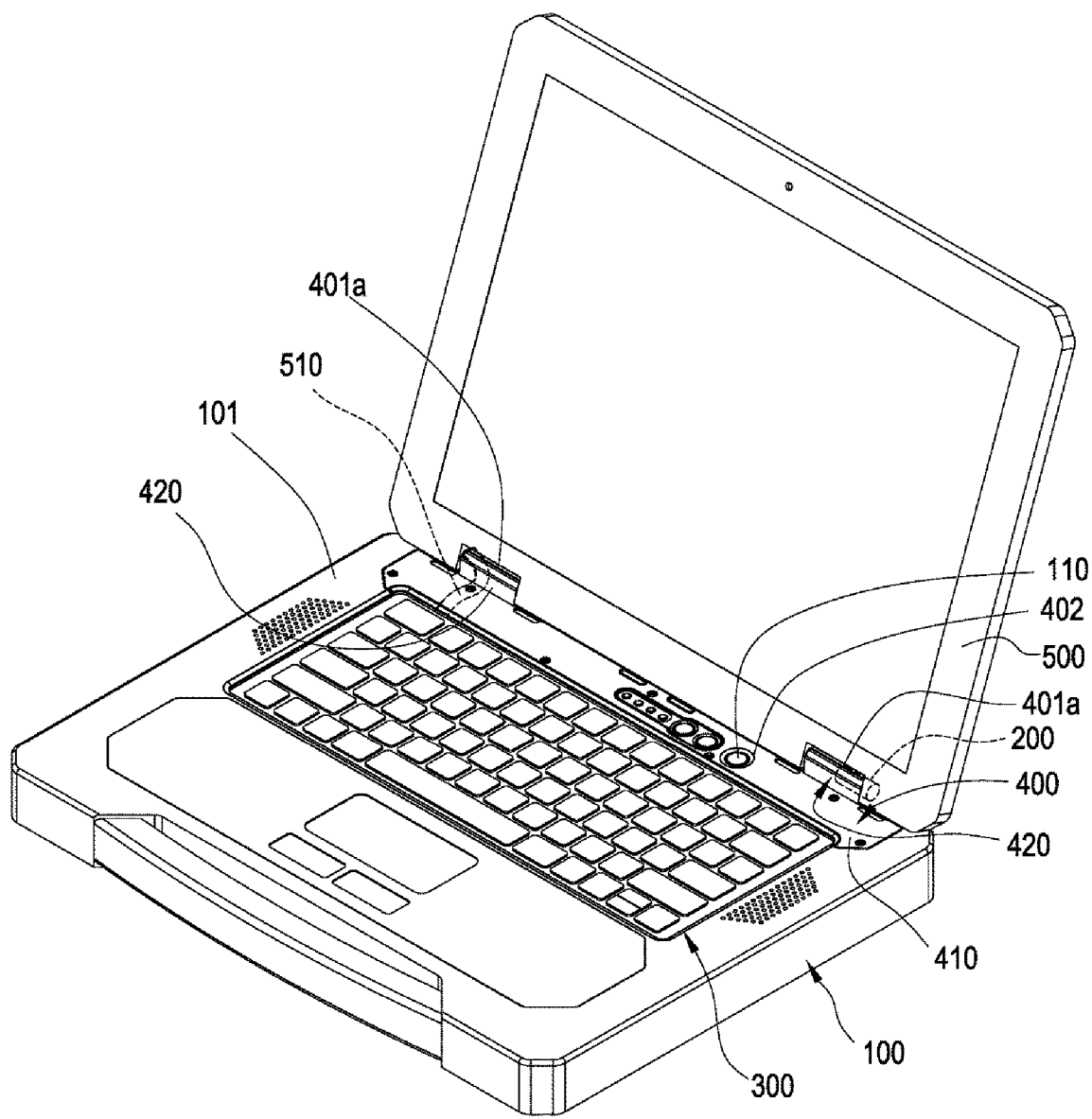
FIG. 1 and FIG. 2 are perspective views of a mobile device keyboard fixing structure according to the first embodiment of the present disclosure.
Figure 2:
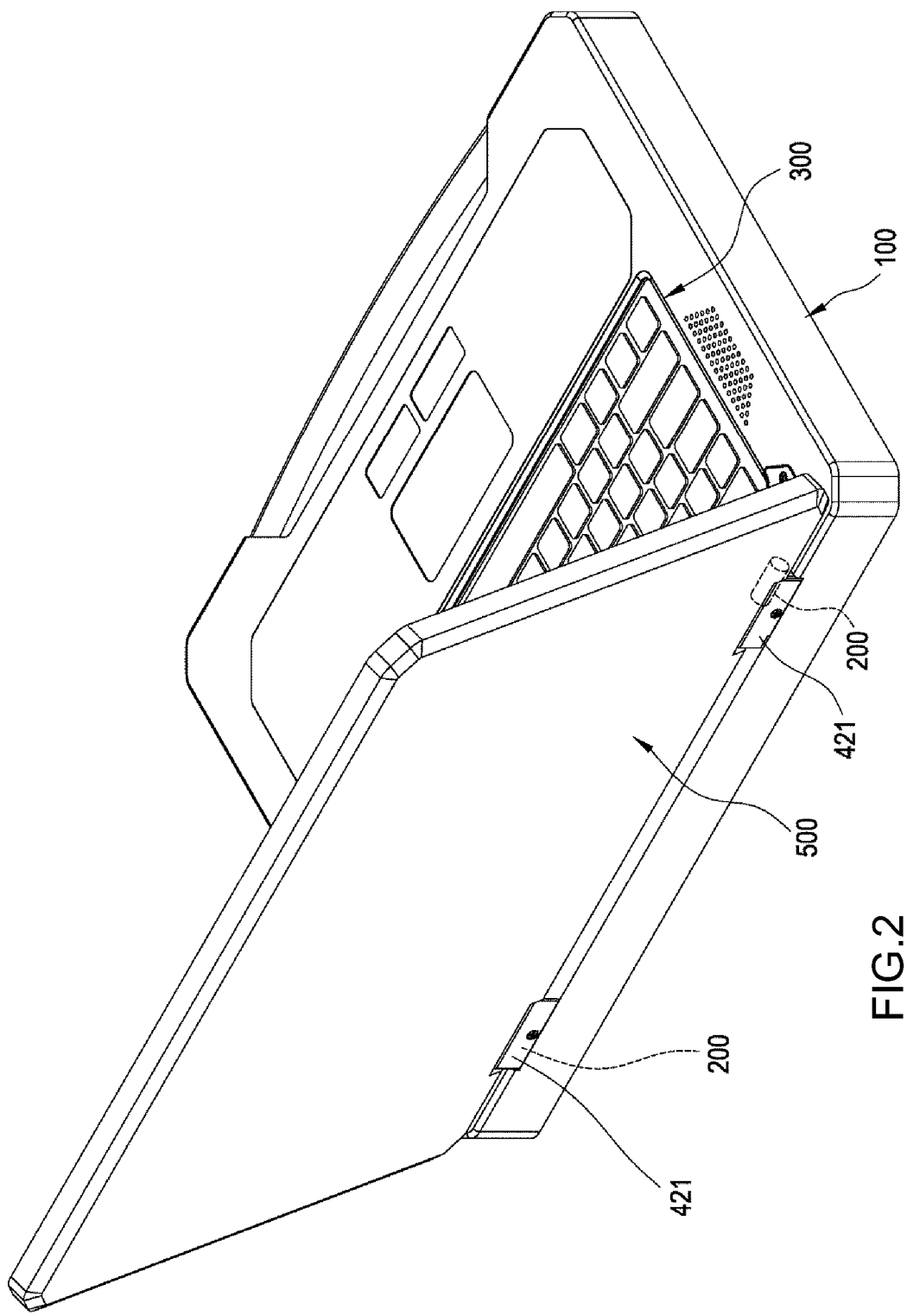

Referring to FIG. 1 and FIG. 2, the first embodiment of the present disclosure provides a mobile device keyboard fixing structure which comprises a body 100, a screen pivot component 200, a keyboard 300 and a keyboard lid 400. The body 100 is flat. The screen pivot component 200 is protrudingly disposed on a top surface 101 of the body 100 and disposed on one lateral side of the top surface 101. The screen pivot component 200 is pivotally connected to a screen component 500. The keyboard 300 is attached to and disposed on the top surface 101 of the body 100.

Figure 3:
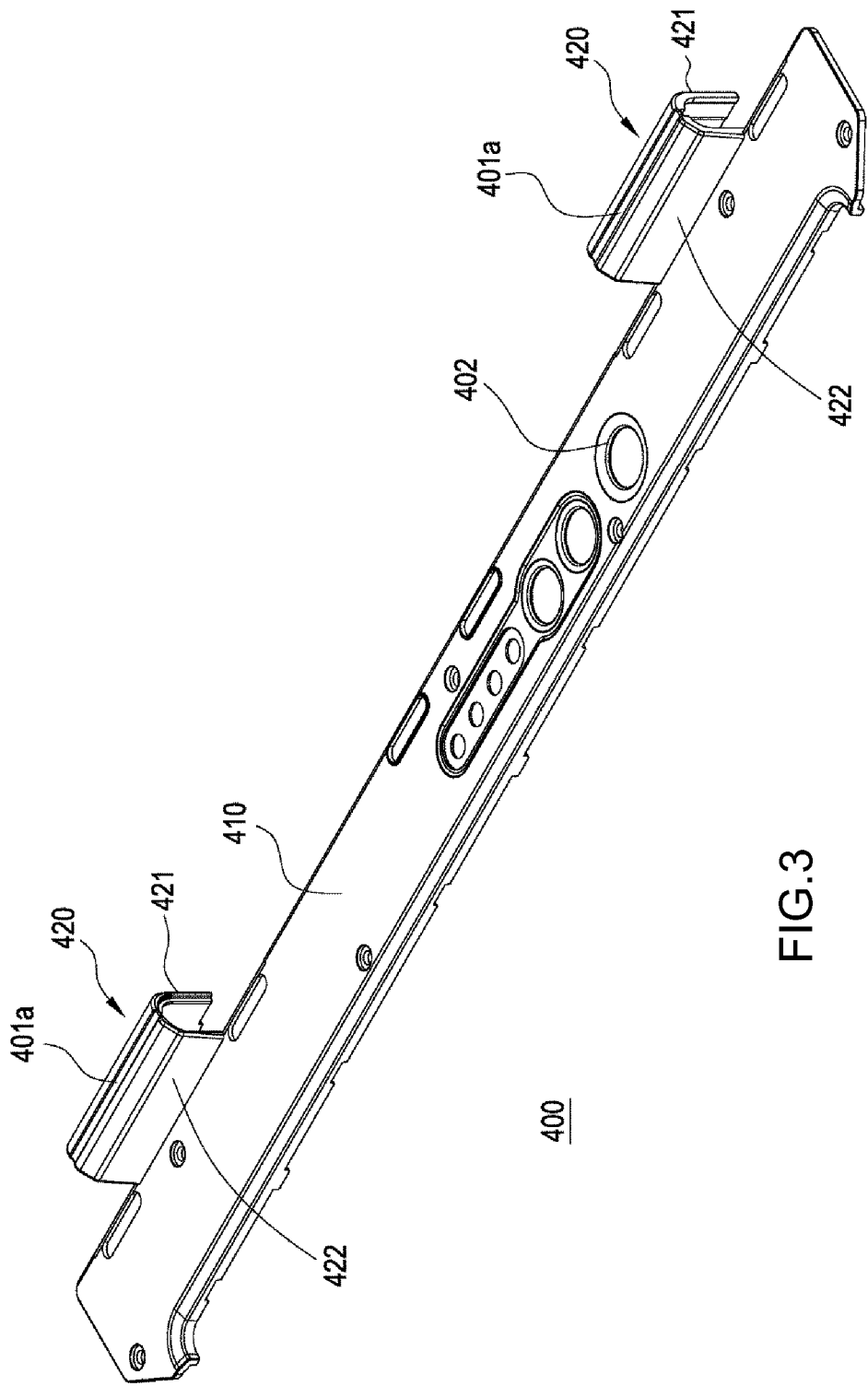
FIG. 3 and FIG. 4 are perspective views of a keyboard lid of the mobile device keyboard fixing structure according to the first embodiment of the present disclosure.
Figure 4:
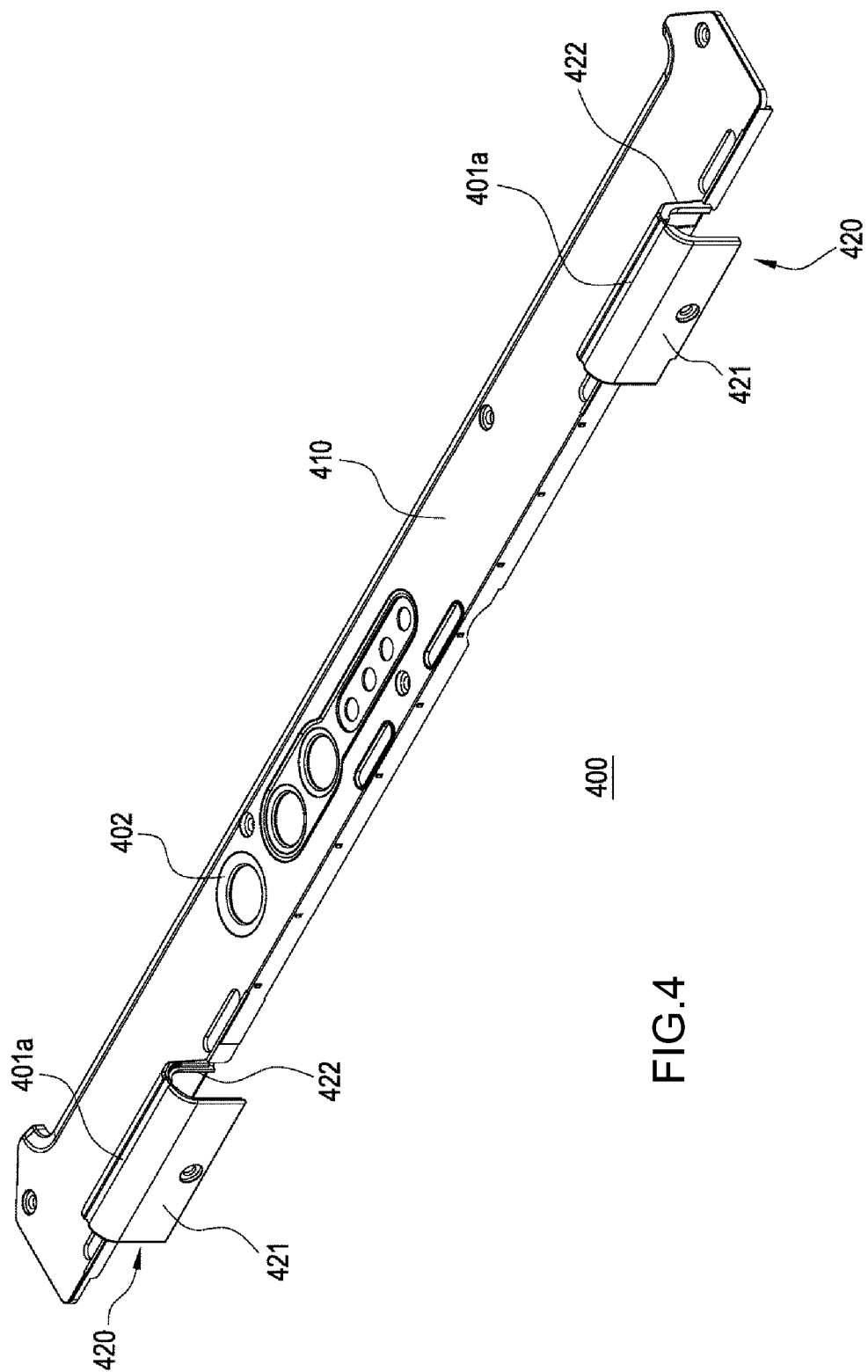
Figure 5:
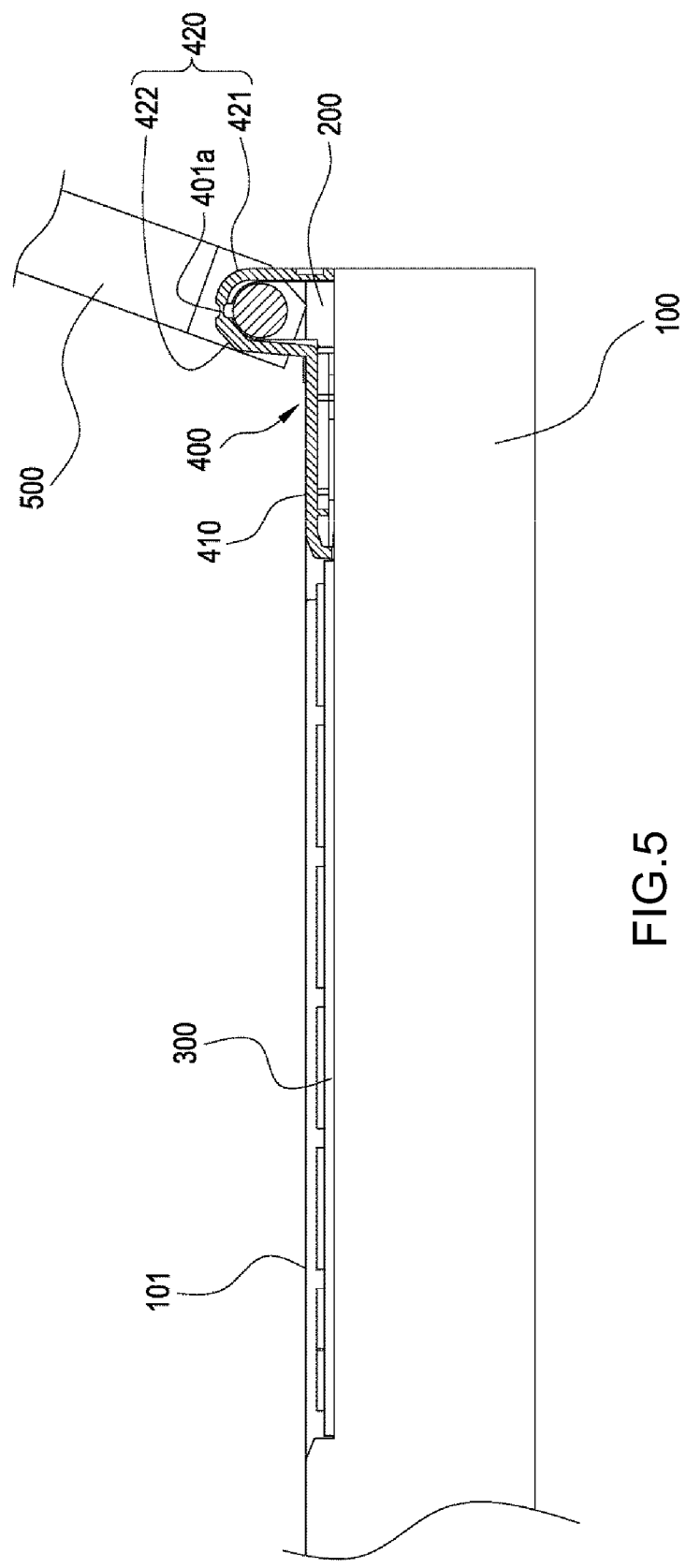
FIG. 5 through FIG. 7 are schematic views of how to operate the mobile device keyboard fixing structure according to the first embodiment of the present disclosure.

Referring to FIG. 3 through FIG. 5, the keyboard lid 400 is made of thermoplastic polyurethane (TPU) and integrally formed. The thermoplastic polyurethane is flexible and hard, such that the keyboard lid 400 functions as a structural element and is capable of bending. The keyboard lid 400 is disposed on the top surface 101 of the body 100. The keyboard lid 400 comprises a panel 410 and a pivot cover 420. The panel 410 and the pivot cover 420 are integrally connected.

The pivot cover 420 has a fixing portion 421 and an inversion lid 422. The inversion lid 422 connects to the panel 410 and the fixing portion 421. The screen pivot component 200 is received inside the pivot cover 420. The inversion lid 422 and the fixing portion 421 cover two opposite sides of the screen pivot component 200, respectively. The fixing portion 421 is fastened to the screen pivot component 200 and thus fixes the keyboard lid 400 in place. The screen component 500 has a transmission wire 510 extended outward. The transmission wire 510 penetrates the pivot cover 420 and then extends to the inside of the body 100. The panel 410 presses against an edge of the keyboard 300 and is demountably fastened to the body 100, thereby allowing the keyboard 300 to be fixed to the body 100. When the body 100 has thereon a function key 110, at least one function key hole 402 corresponding in position to the function key 110 is penetratingly formed on the panel 410, thereby allowing the function key 110 to be exposed from the at least one function key hole 402.

A bend groove 401a is formed between the panel 410 and the fixing portion 421. The bend groove 401a extends across the surface of the keyboard lid 400. The bend groove 401a starts from one edge of the keyboard lid 400, crosses the keyboard lid 400, and reaches the other edge of the keyboard lid 400. Thus, the keyboard lid 400 can bend along the bend groove 401a. In this embodiment, the bend groove 401a is formed on the pivot cover 420; specifically speaking, the bend groove 401a is formed at a junction between the inversion lid 422 and the fixing portion 421. The inversion lid 422 can be inverted along the bend groove 401a relative to the fixing portion 421. Therefore, the panel 410 can be inverted along the bend groove 401a relative to the fixing portion 421 to release the keyboard 300 and the function key hole 402. Preferably, the transmission wire 510 is disposed between the fixing portion 421 and the screen pivot component 200 to preclude the exposure of the transmission wire 510 when the panel 410 is opened.

In this embodiment, the bend groove 401a is formed on one of the sides of the keyboard lid 400, whereas another bend groove 401a is optionally formed at a corresponding point on the other side of the keyboard lid 400, thereby enabling the keyboard lid 400 to bend easily.

Figure 6:
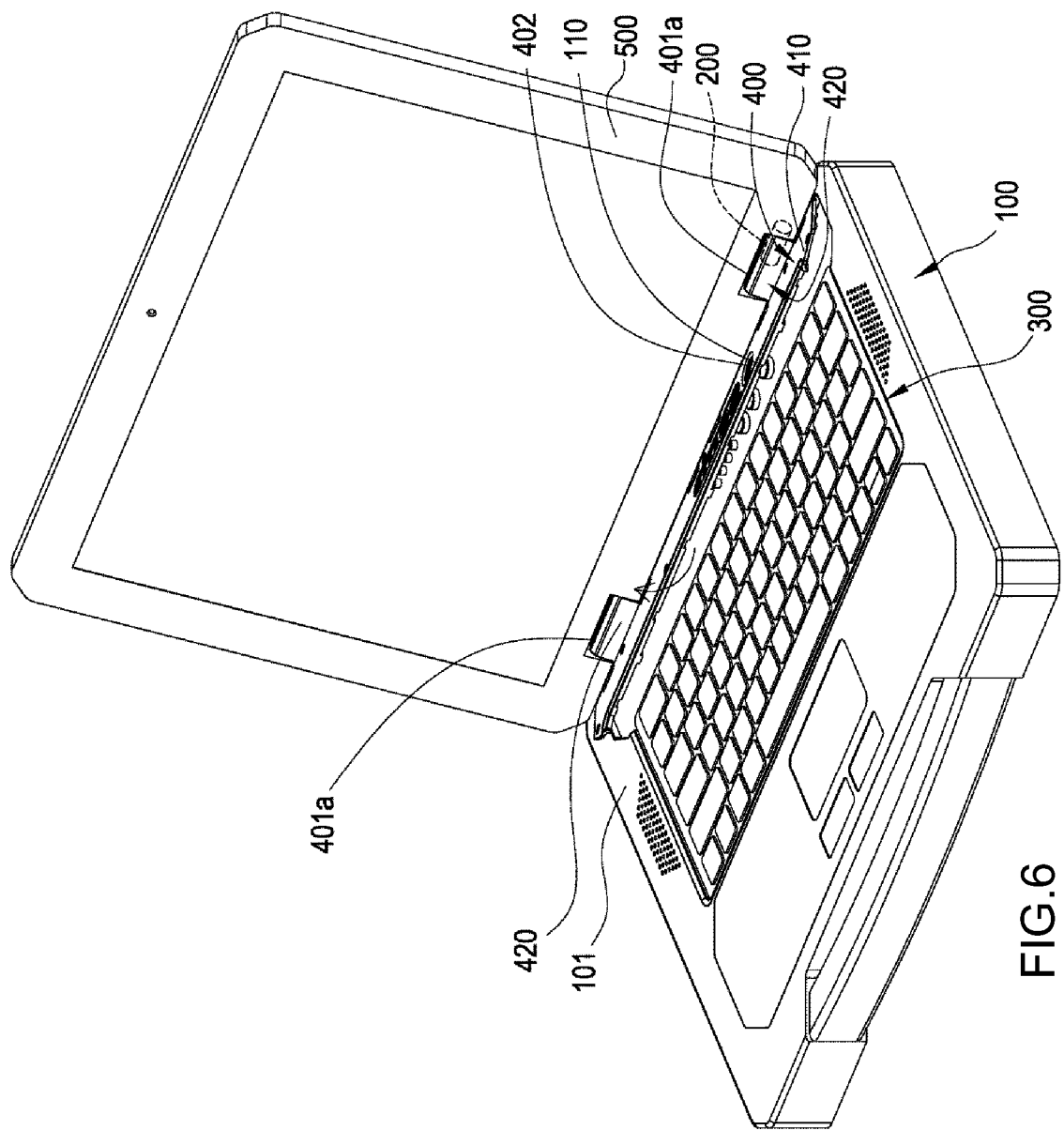
Figure 7:
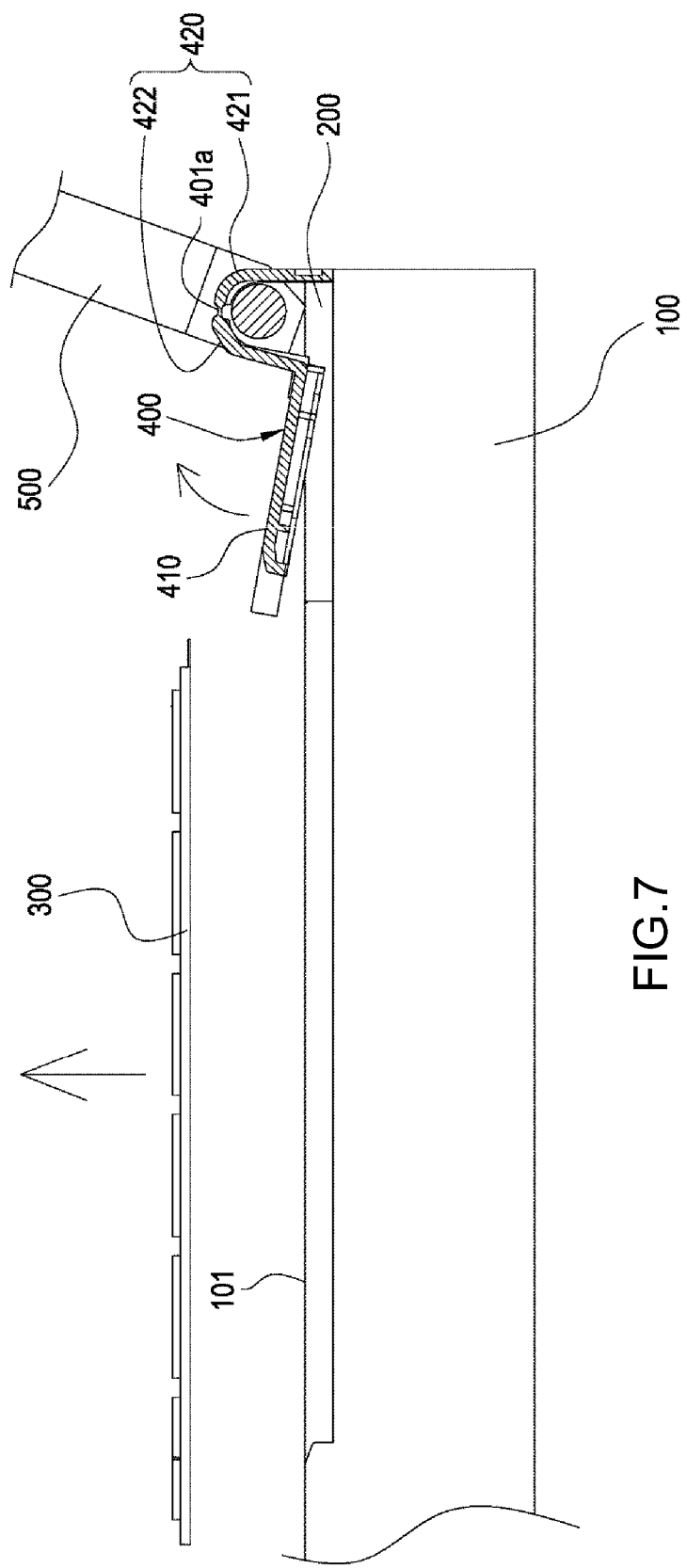

Referring to FIG. 5 through FIG. 7, in this embodiment, the mobile device keyboard fixing structure of the present disclosure is advantageous in that the bend groove 401a is disposed on each of the two pivot covers 420 of the keyboard lid 400. Therefore, a user only needs to demount a few screws in order to open the keyboard lid 400 as easily as a door. Therefore, not only can the keyboard 300 be quickly changed without removal of the entire keyboard lid 400, but the transmission wire 510 is also protected against damage.

Figure 8:
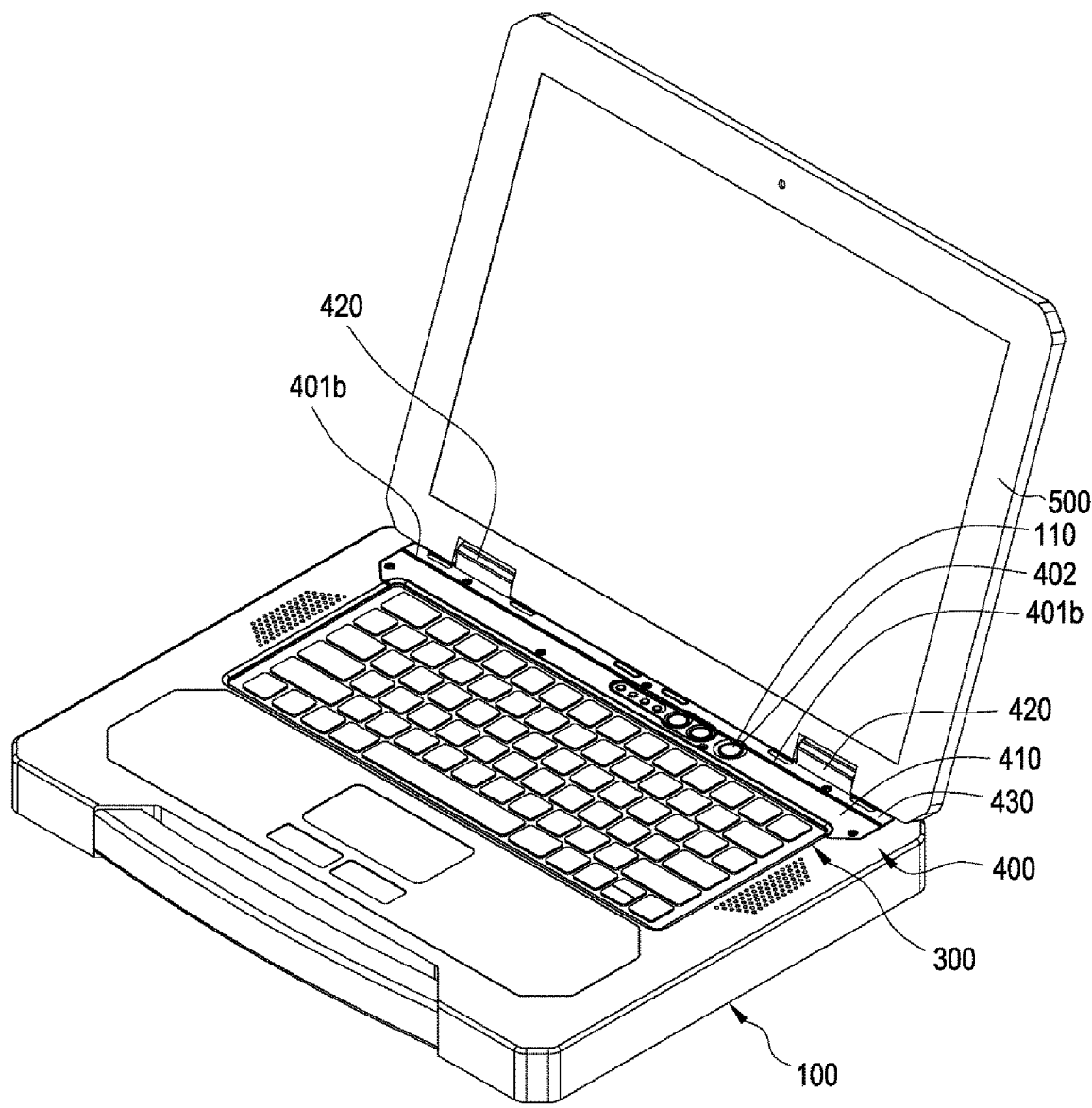
FIG. 8 is a perspective view of a mobile device keyboard fixing structure according to the second embodiment of the present disclosure.

Referring to FIG. 8, the second embodiment of the present disclosure provides a mobile device keyboard fixing structure which comprises a body 100, a screen pivot component 200, a keyboard 300 and a keyboard lid 400. The body 100 is flat. The screen pivot component 200 is protrudingly disposed on the top surface 101 of the body 100 and disposed on one lateral side of the top surface 101. The screen pivot component 200 is pivotally connected to a screen component 500. The keyboard 300 is attached to and disposed on the top surface 101 of the body 100.

Figure 9:
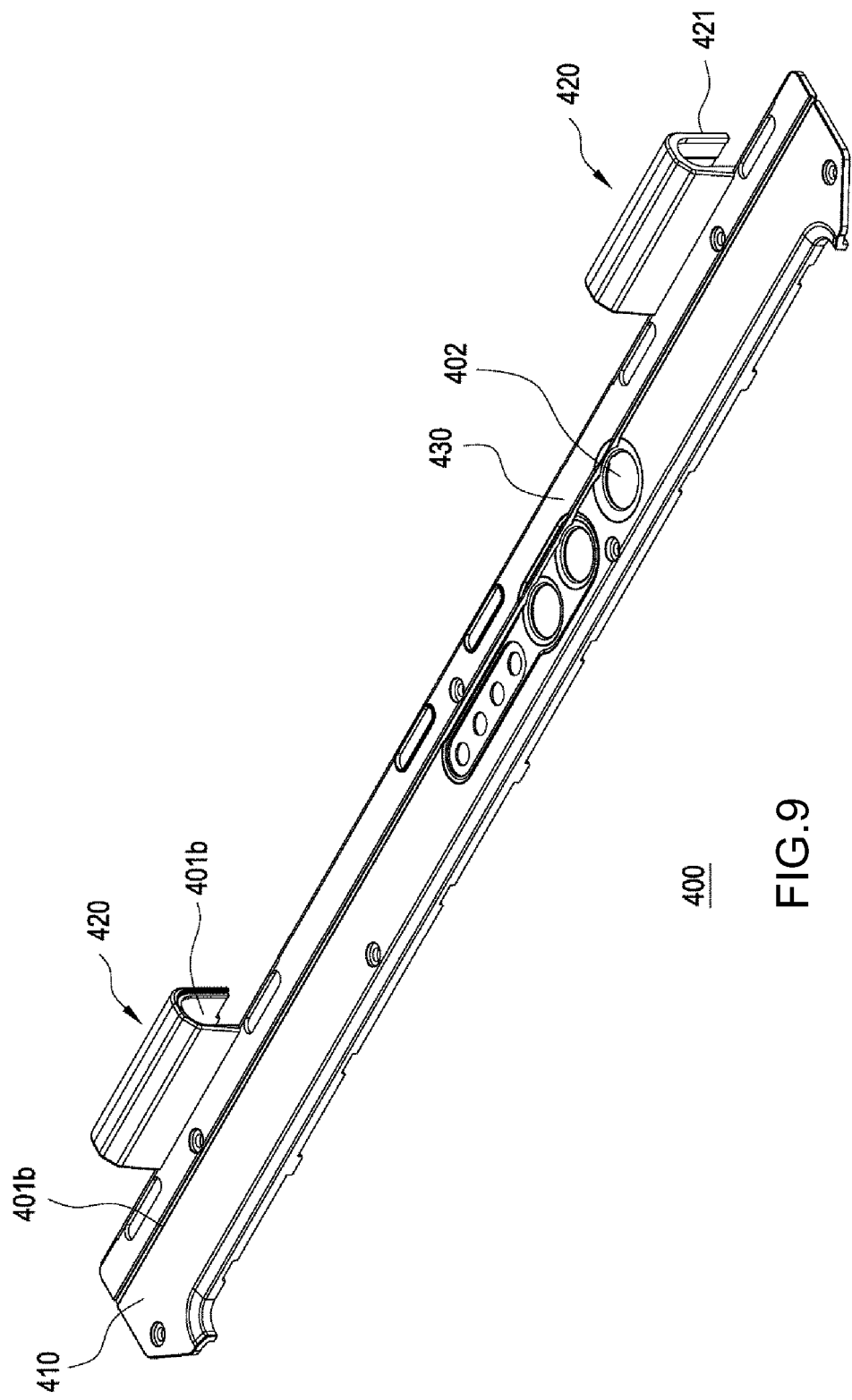
FIG. 9 is a perspective view of a keyboard lid of the mobile device keyboard fixing structure according to the second embodiment of the present disclosure.
Figure 10:
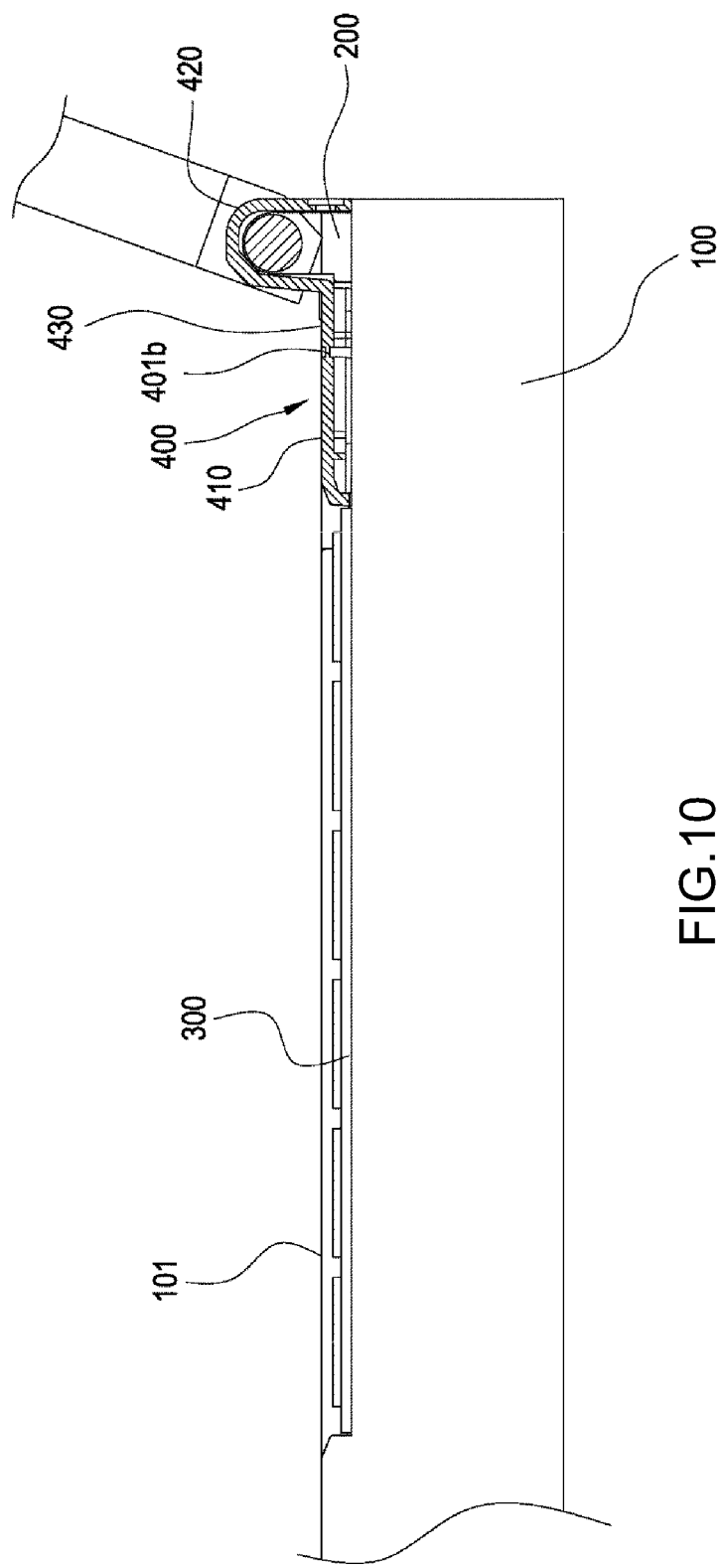
FIG. 10 and FIG. 11 are schematic views of how to operate the mobile device keyboard fixing structure according to the second embodiment of the present disclosure.

Referring to FIG. 9 and FIG. 10, the keyboard lid 400 is made of thermoplastic polyurethane (TPU) and integrally formed. The thermoplastic polyurethane is flexible and hard, such that the keyboard lid 400 functions as a structural element and is capable of bending. The keyboard lid 400 is disposed on the top surface 101 of the body 100. The keyboard lid 400 comprises a panel 410, a pivot cover 420 and a connecting portion 430 which are integrally connected. The connecting portion 430 connects to the panel 410 and the pivot cover 420.

In this embodiment, the pivot cover 420 has a fixing portion 421, and the screen pivot component 200 is received in the pivot cover 420. The fixing portion 421 is fastened to the screen pivot component 200 and thus fixes the keyboard lid 400 in place. The connecting portion 430 covers the body 100. The panel 410 presses against an edge of the keyboard 300 and is demountably fastened to the body 100, thereby allowing the keyboard 300 to be fixed to the body 100. When the body 100 has thereon the function key 110, at least one function key hole 402 corresponding in position to the function key 110 is penetratingly formed on the panel 410, thereby allowing the function key 110 to be exposed from the at least one function key hole 402.

A bend groove 401b is formed between the panel 410 and the fixing portion 421. The bend groove 401b extends across the surface of the keyboard lid 400. The bend groove 401b starts from one edge of the keyboard lid 400, crosses the keyboard lid 400, and reaches the other edge of the keyboard lid 400. Thus, the keyboard lid 400 can bend along the bend groove 40 lb. In this embodiment, the bend groove 401b is formed at a junction between the panel 410 and the connecting portion 430. Therefore, the panel 410 can be inverted along the bend groove 401b relative to the fixing portion 421 to release the keyboard 300 and the function key hole 402. The connecting portion 430 is fastened to the body 100, such that the connecting portion 430 and the pivot cover 420 cannot move despite the inversion of the panel 410.

In this embodiment, the bend groove 401b is formed on one of the sides of the keyboard lid 400, whereas another bend groove 401b is optionally formed at a corresponding point on the other side of the keyboard lid 400, thereby enabling the keyboard lid 400 to bend easily.

Figure 11:
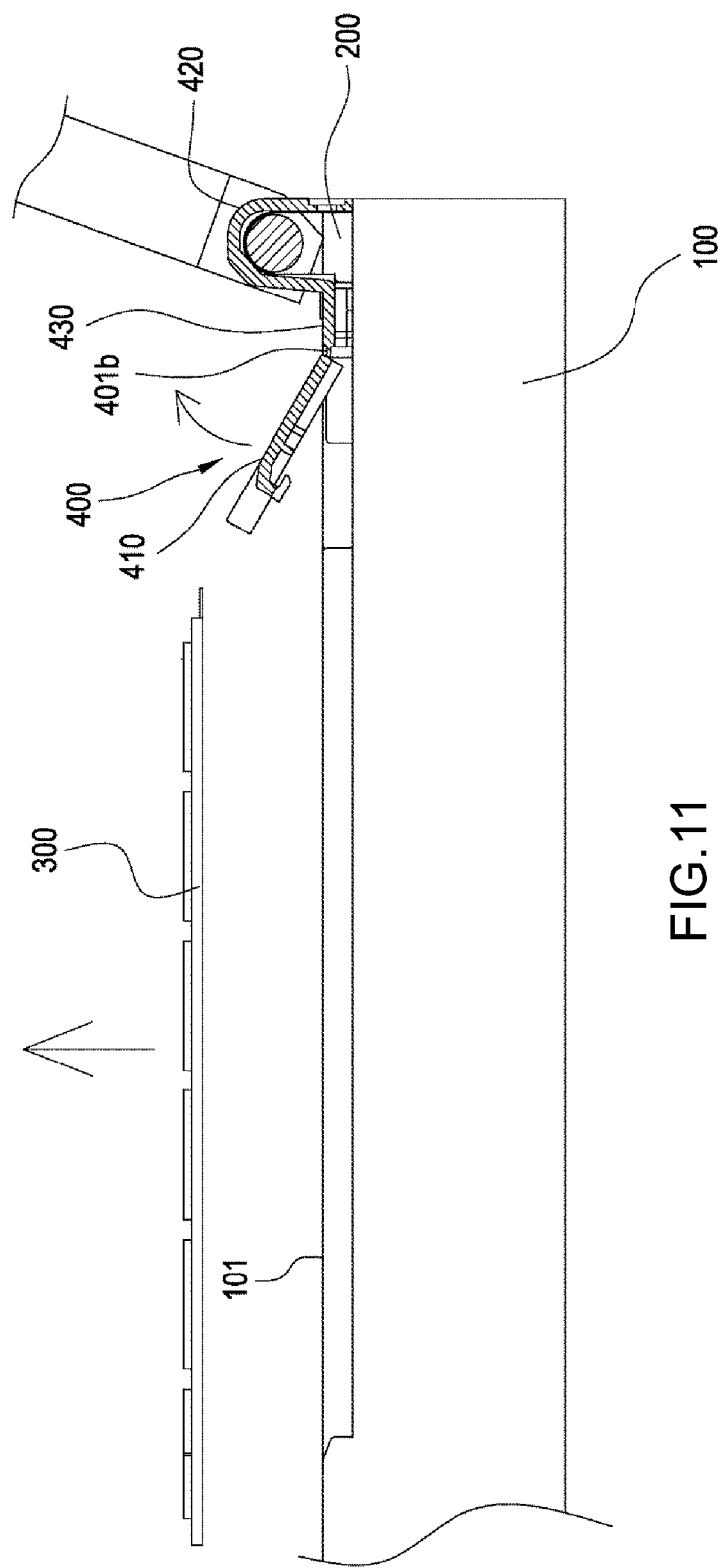

Referring to FIG. 10 and FIG. 11, in this embodiment, the mobile device keyboard fixing structure of the present disclosure is advantageous in that the bend groove 401b is disposed at the middle structure of the keyboard lid 400, such that a user only needs to demount a few screws in order to open the keyboard lid 400 as easily as a door. Therefore, not only can the keyboard 300 be quickly changed without removal of the entire keyboard lid 400, but the transmission wire 510 is also protected against damage.

Although the present disclosure is disclosed above by preferred embodiments, the preferred embodiments are not restrictive of the claims of the present disclosure. Equivalent changes made to the preferred embodiments in accordance with the spirit of the present disclosure must be deemed falling within the scope of the claims of the present disclosure.

What is claimed is:

1. A mobile device keyboard fixing structure, comprising:
   a body;
   a screen pivot component disposed at the body;
   a keyboard disposed at the body; and
   a keyboard lid comprising a panel and a pivot cover, the pivot cover having a fixing portion fastened to the screen pivot component, with a bend groove formed between the panel and the fixing portion, with the screen pivot component received inside the pivot cover and fixed in place by the fixing portion, the panel pressing against an edge of the keyboard and demountably fastened to the body, thereby allowing the panel to be inverted along the bend groove relative to the fixing portion.

2. The mobile device keyboard fixing structure of claim 1, wherein the screen pivot component is connected to a screen component, and the screen component has a transmission wire extended outward, with the transmission wire penetrating the pivot cover then extending to the inside of the body.

3. The mobile device keyboard fixing structure of claim 1, wherein at least one function key hole is penetratingly formed on the panel.

4. The mobile device keyboard fixing structure of claim 1, wherein the bend groove is formed on one of the sides of the keyboard lid, and another bend groove is formed at a corresponding point on the other side of the keyboard lid.

5. The mobile device keyboard fixing structure of claim 1, wherein the keyboard lid is made of thermoplastic polyurethane (TPU) and integrally formed.

6. The mobile device keyboard fixing structure of claim 1, wherein the bend groove extends across the surface of the keyboard lid, and the bend groove starts from one edge of the keyboard lid, crosses the keyboard lid, and reaches the other edge of the keyboard lid.

7. The mobile device keyboard fixing structure of claim 1, wherein the bend groove is formed on the pivot cover.

8. The mobile device keyboard fixing structure of claim 7, wherein the pivot cover has an inversion lid, the inversion lid connecting to the panel and the fixing portion, and the bend groove is formed at a junction between the inversion lid and the fixing portion, thereby allowing the inversion lid to be inverted along the bend groove relative to the fixing portion.

9. The mobile device keyboard fixing structure of claim 8, wherein the inversion lid and the fixing portion cover two opposite sides of the screen pivot component, respectively.

10. The mobile device keyboard fixing structure of claim 1, wherein the keyboard lid has a connecting portion connecting to the panel and the pivot cover, and the bend groove is formed at a junction between the panel and the connecting portion.

11. The mobile device keyboard fixing structure of claim 10, wherein the connecting portion covers the body.

12. The mobile device keyboard fixing structure of claim 10, wherein the connecting portion is fastened to the body.

\* \* \* \* \*